US009940310B1

(12) United States Patent
Cherukuri et al.

(10) Patent No.: US 9,940,310 B1
(45) Date of Patent: Apr. 10, 2018

(54) AUTOMATICALLY CONVERTING AN ELECTRONIC PUBLICATION INTO AN ONLINE COURSE

(71) Applicant: Snapwiz Inc., Fremont, CA (US)

(72) Inventors: Sriram Cherukuri, San Jose, CA (US); Satish Kumar, Union City, CA (US); Ranjan Parthasarathy, Mountain View, CA (US); Madhusudana Narasa, San Ramon, CA (US); Aditya S. Agarkar, Fremont, CA (US)

(73) Assignee: Snapwiz Inc., Fremont, CA (US)

( * ) Notice: Subject to any disclaimer, the term of this patent is extended or adjusted under 35 U.S.C. 154(b) by 444 days.

(21) Appl. No.: 14/634,205

(22) Filed: Feb. 27, 2015

Related U.S. Application Data

(60) Provisional application No. 61/947,804, filed on Mar. 4, 2014.

(51) Int. Cl.
*G06F 17/22* (2006.01)
*G06F 17/21* (2006.01)

(52) U.S. Cl.
CPC ........ *G06F 17/2247* (2013.01); *G06F 17/211* (2013.01)

(58) Field of Classification Search
CPC ................................ G06F 17/22; G06F 17/21
See application file for complete search history.

(56) References Cited

U.S. PATENT DOCUMENTS

| | | | | |
|---|---|---|---|---|
| 2003/0028363 | A1* | 2/2003 | Nobili | G06F 9/54 704/1 |
| 2003/0232318 | A1* | 12/2003 | Altenhofen | G09B 7/00 434/362 |
| 2004/0103374 | A1* | 5/2004 | Chishima | G06F 17/30899 715/234 |
| 2004/0177319 | A1* | 9/2004 | Horn | G06F 17/3002 715/205 |
| 2004/0205578 | A1* | 10/2004 | Wolff | G06F 17/2247 715/239 |
| 2004/0259068 | A1* | 12/2004 | Philipp | G06Q 10/10 434/350 |
| 2005/0287509 | A1* | 12/2005 | Mohler | G09B 7/00 434/350 |
| 2008/0148236 | A1* | 6/2008 | Huang | G06F 11/3684 717/124 |
| 2009/0031279 | A1* | 1/2009 | Budinsky | G06F 8/24 717/104 |
| 2009/0125413 | A1* | 5/2009 | Le Chevalier | G06Q 30/06 705/26.1 |
| 2010/0114823 | A1* | 5/2010 | Sykes | G06F 17/3089 707/626 |

(Continued)

FOREIGN PATENT DOCUMENTS

EP        1587324 A1 * 10/2005 ....... G06F 17/30997

*Primary Examiner* — Scott T Baderman
*Assistant Examiner* — Sookil J Lee
(74) *Attorney, Agent, or Firm* — Park, Vaughan, Fleming & Dowler LLP; Laxman Sahasrabuddhe (57) ABSTRACT

A publisher can extend existing electronic publications (e.g., formatted in EPUB format) by adding additional data such as interactive content, supplementary learning resources, etc. The extended electronic publication can then be automatically imported to create an online course that corresponds to the electronic publication.

11 Claims, 5 Drawing Sheets

(56) References Cited

U.S. PATENT DOCUMENTS

| | | | | |
|---|---|---|---|---|
| 2010/0279264 | A1* | 11/2010 | Barazanji | G06Q 10/10 434/322 |
| 2011/0088014 | A1* | 4/2011 | Becker | G06F 11/3684 717/125 |
| 2011/0236873 | A1* | 9/2011 | Bowers | G06F 11/3684 434/362 |
| 2012/0131003 | A1* | 5/2012 | Artin | G06F 17/211 707/736 |
| 2012/0131427 | A1* | 5/2012 | Artin | G06F 17/211 715/201 |
| 2013/0004935 | A1* | 1/2013 | Smith | G09B 5/06 434/365 |
| 2014/0072945 | A1* | 3/2014 | Gu | G09B 5/12 434/350 |
| 2014/0157120 | A1* | 6/2014 | Le Chevalier | G06F 17/30563 715/273 |
| 2014/0173412 | A1* | 6/2014 | MacAulay | G06F 21/60 715/234 |
| 2014/0308645 | A1* | 10/2014 | Chaniotakis | G09B 7/077 434/350 |
| 2015/0242979 | A1* | 8/2015 | Abts | G09B 5/00 705/328 |

\* cited by examiner

Receive the electronic publication comprising informational content, standardized markup language tags, and standardized markup language attributes, wherein the standardized markup language tags and standardized markup language attributes specify styling and layout of the informational content for presentation on a standard electronic reader
102

Add metadata for digital assets to the electronic publication, wherein the metadata for the digital assets is embedded in the electronic publication in a manner that causes the standard electronic reader to ignore the metadata while presenting the electronic publication, and wherein the digital assets along with the metadata for the digital assets enable delivery of the online course corresponding to the electronic publication
104

Create the extended electronic publication by packaging the digital assets with the electronic publication containing the added metadata for the digital assets
106

AUTOMATICALLY CONVERTING AN ELECTRONIC PUBLICATION INTO AN ONLINE COURSE

RELATED APPLICATION

This application claims priority to U.S. Provisional Patent Application No. 61/947,804, entitled "Method and System for Automated Conversion of Electronic Textbook in EPUB-3 Format into an Online Course," by the same inventors, filed on 4 Mar. 2014, the contents of which are herein incorporated by reference in their entirety for all purposes.

BACKGROUND

Technical Field

This disclosure relates to e-books (electronic books) and online learning. More specifically, this disclosure relates to methods and apparatuses for automatically converting an electronic publication into an online course.

Related Art

Publishers typically convert academic textbook content into a digital textbook (also referred to as an e-book) format such as EPUB-3. An EPUB-3 e-book is generally composed of HTML files and other media assets organized in a textbook-like hierarchical format such as chapters, sections and topics. To support navigation to a particular content, an e-book usually has a table of contents and page references. An e-book can be read using a standard electronic reader, e.g., e-book reader software on desktop computers and on handheld devices. For example, Amazon.com, Inc.'s Kindle is a popular e-book reader (Amazon, Kindle, and related logos are trademarks of Amazon.com, Inc. or its affiliates).

An online course typically requires additional features related to online learning that are not offered by e-books. The creation, organization, and semantic tagging of course content is a labor-intensive task, and exceedingly difficult to achieve without substantial time investment by experts. Publishers of academic textbooks often spend a large amount of time and resources to transform their passive academic textbooks into online courses.

In existing approaches, the management systems for handling e-books and online courses are separate and uncoordinated, which leads to duplication of content and creates content synchronization problems, because two copies of the same content may be edited separately and inconsistently in the two different systems.

SUMMARY

Even though e-books contain digital assets such as video, assessments, and other multimedia content, they lack features related to online learning such as (1) rich interactive user interfaces, (2) ability to customize learning paths for an individual, (3) capability to measure skill proficiency and create a personalized skill profile, (4) social learning features such as online discussions, (5) user interfaces that enable interaction with instructors and peers, and (6) highly complex analytical functions such as reporting of proficiency, learning rate, meta-cognition, and other latent traits.

Some embodiments described herein provide methods and systems for automatically converting an e-book into an online course by extending the content of the e-book with features related to online learning. Specifically, some embodiments described herein provide systems and techniques for creating an extended electronic publication based on an electronic publication, wherein the extended electronic publication enables delivery of an online course corresponding to the electronic publication.

Some embodiments can receive an electronic publication comprising informational content, standardized markup language tags, and standardized markup language attributes. The standardized markup language tags and the standardized markup language attributes specify how the informational content is to be presented by a standard electronic reader. Next, the embodiments can add metadata for digital assets to the electronic publication, wherein the metadata for the digital assets is embedded in the electronic publication in a manner that causes the standard electronic reader to ignore the metadata while presenting the electronic publication, and wherein the digital assets along with the metadata for the digital assets enable delivery of an online course corresponding to the electronic publication. The embodiments can then create the extended electronic publication by packaging the digital assets with the electronic publication containing the added metadata for the digital assets.

Once created, the extended electronic publication can be published as an e-book, thereby enabling users to download and read the e-book on a standardized electronic reader. Concurrently, the extended electronic publication can be imported into an online course delivery platform, thereby enabling users to take an online course corresponding to the e-book.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Automatically Converting an Electronic Publication into an Online Course

Figure 1:
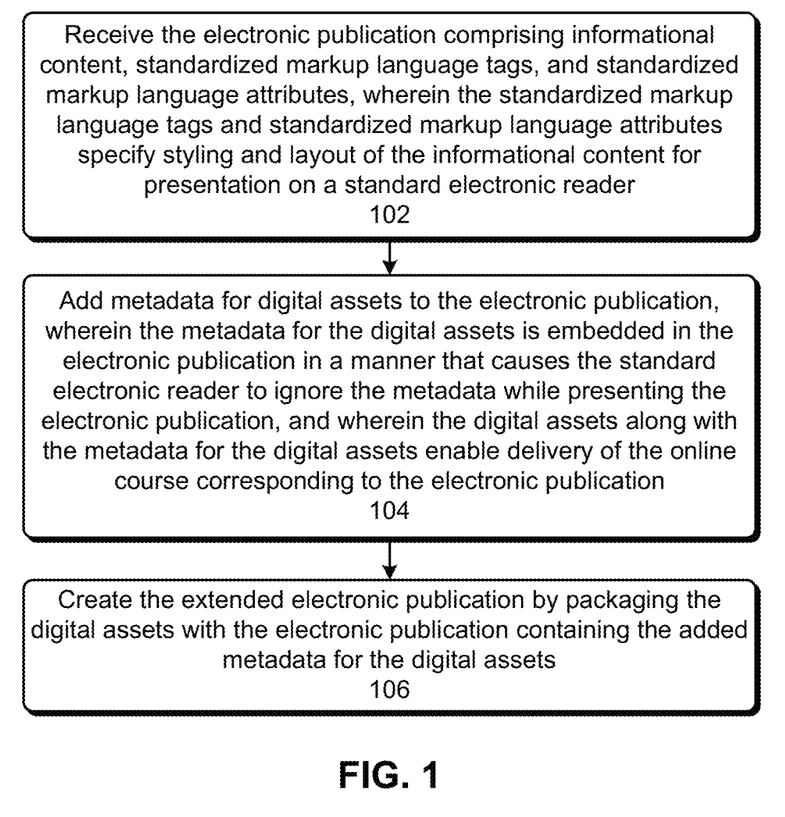
FIG. 1 illustrates a process for creating an extended electronic publication in accordance with some embodiments described herein.

FIG. 1 illustrates a process for creating an extended electronic publication in accordance with some embodiments described herein. The process can begin by receiving the electronic publication comprising informational content, standardized markup language tags, and standardized markup language attributes, wherein the standardized markup language tags and standardized markup language attributes specify styling and layout of the informational content for presentation on a standard electronic reader (operation 102).

For example, the electronic publication and the extended electronic publication can be in EPUB format. EPUB is a free and open electronic book standard that is published by the International Digital Publishing Forum. The term "EPUB" or "EPUB format" refers to any one of the standardized versions of the EPUB format. The EPUB format standardizes markup language tags and markup language attributes that can be used to specify styling and layout of the informational content. A standard electronic reader (e.g., an electronic reader that adheres to the EPUB standard) can use the standardized markup language tags and standardized markup language attributes in an electronic publication to present the informational content with the intended styling and layout.

Next, the process can add metadata for digital assets to the electronic publication, wherein the metadata for the digital assets is embedded in the electronic publication in a manner that causes the standard electronic reader to ignore the metadata while presenting the electronic publication, and wherein the digital assets along with the metadata for the digital assets enable delivery of the online course corresponding to the electronic publication (operation 104).

In some embodiments, the metadata can be specified as a value of a non-standard attribute, wherein the non-standard attribute is ignored by the standard electronic reader. Specifically, a "non-standard attribute" is an attribute that is not defined in the standardized markup language that is used for formatting the electronic publication. For example, a non-standard attribute would be an attribute that is not defined by EPUB, and is therefore ignored by standard electronic readers that adhere to the EPUB standard. The metadata for each digital asset can generally be encoded in any format, such as JavaScript Object Notation (JSON) format.

In some embodiments, the metadata for each digital asset includes a universally unique identifier (UUID) that is unique across the extended electronic publication. In some embodiments, the extended electronic publication includes multiple references to a digital asset, wherein the metadata for each reference to the digital asset includes a distinct UUID. In some embodiments, the metadata for each reference to the digital asset includes a user interaction feature, wherein a state of the user interaction feature for each reference to the digital asset is maintained independently of the states of the user interaction features for other references to the digital asset. In general, the metadata can generally include information that is useful in an online learning environment. For example, the metadata can include references to audio files, video files, pictures, documents, executable code, scripts, or any other digital asset that is used in the online course.

In some embodiments, the user interaction feature enables a user to post a comment for the digital asset, and to read comments for the digital asset that were posted by other users. In some embodiments, the user interaction feature enables a user to communicate with an instructor. In some embodiments, the user interaction feature enables a user to demonstrate proficiency by answering a series of questions related to the digital asset. In some embodiments, the user interaction feature enables a user to manipulate the digital asset.

For example, a picture of a person kicking a soccer ball can appear in two different chapters of a book. One chapter may relate to the sport of soccer and the other chapter may relate to exercise and nutrition. Some embodiments can keep a single copy of the digital asset (e.g., the picture), and the extended electronic publication can refer to this single copy in multiple locations (e.g., the extended electronic publication can refer to the picture in two different chapters) in the digital asset.

To keep track of the different references, the embodiments can associate distinct UUIDs with the different references, thereby enabling the embodiments to independently maintain the state of the user interaction features associated with the multiple references. For example, if a user interaction feature enables a user to post a comment for a given digital asset, then the comments that are posted for one of the references to the digital asset (e.g., the comments for the picture in the chapter about the sport of soccer) can be maintained independently of the comments that are posted for the other reference to the digital asset (e.g., the comments for the picture in the chapter about exercise and fitness).

In the above example the "state" of the user interaction feature included the set of comments that were posted for the picture. However, in general, the "state" of a user interaction feature can include any data that is generated and/or stored by the embodiments when a user uses the user interaction feature. For example, if the user interaction feature enables a user to communicate with an instructor, then the state of the user interaction feature can include a history of the communication. Likewise, if the user interaction feature enables a user to demonstrate proficiency by answering a series of questions related to the digital asset, then the state of the user interaction feature can include the history of the answers and the grades. In some embodiments, the user interaction feature enables a user to manipulate the digital asset. For example, if the digital asset is a high resolution picture, then the user interaction feature can allow the user to zoom in to the picture. In this example, the state of the user interaction feature can include a zoom level.

Continuing with the description of the process illustrated in FIG. 1, the process can then create the extended electronic publication by packaging the digital assets with the electronic publication containing the added metadata for the digital assets (operation 106). Specifically, the files for the electronic publication (i.e., the original electronic publication without the extensions related to online learning) may be stored in a directory. Some embodiments can create a separate directory, and then store the files for the digital assets that are only used in the online course in the newly created directory. The embodiments can then create a single package (e.g., a zip file) that contains the original directory that includes the files for the original electronic publication, and the newly created directory that includes the digital assets that are only used in the online course.

Figure 2:
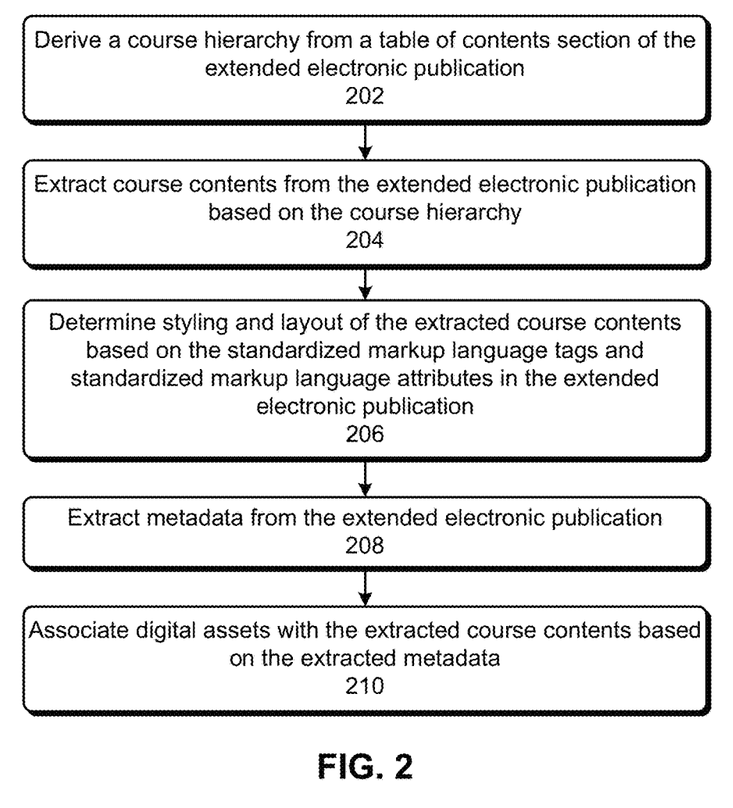
FIG. 2 illustrates a process for importing an extended electronic publication into an online course delivery platform in accordance with some embodiments described herein.

FIG. 2 illustrates a process for importing an extended electronic publication into an online course delivery platform in accordance with some embodiments described herein. The process can begin by deriving a course hierarchy from a table of contents section of the extended electronic publication (operation 202). Next, the process can extract course contents from the extended electronic publication based on the course hierarchy (operation 204). The process can then determine styling and layout of the extracted course contents based on the standardized markup language tags and standardized markup language attributes in the extended electronic publication (operation 206). Next, the process can extract metadata from the extended electronic publication (operation 208). The process can then associate digital assets with the extracted course contents based on the extracted metadata (operation 210).

Figure 3:
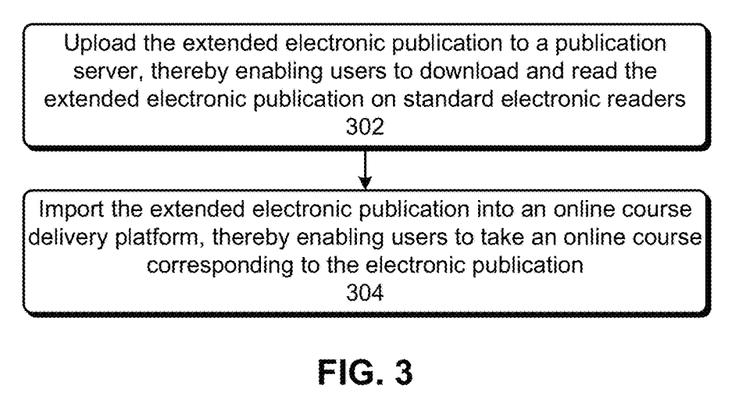
FIG. 3 illustrates a process for publishing an e-book and delivering an online course based on the e-book in accordance with some embodiments described herein.

FIG. 3 illustrates a process for publishing an e-book and delivering an online course based on the e-book in accordance with some embodiments described herein. The process can begin by uploading the extended electronic publication to a publication server, thereby enabling users to download and read the extended electronic publication on standard electronic readers (operation 302). Next, the process can import the extended electronic publication into an online course delivery platform, thereby enabling users to take an online course corresponding to the electronic publication (operation 304). In this manner, publishers of electronic publications do not have to duplicate their efforts because, given an electronic publication, some embodiments described herein can automatically create an extended electronic publication based on the given electronic publication which can be read on standard electronic readers, and automatically deliver an online course based on the electronic publication by importing the extended electronic publication into an online course delivery platform.

Embodiments described herein can help simplify maintaining updates to the electronic publication and simplify propagation of the updates to the online course. Specifically, some embodiments can maintain version information for a set of elements (the set of elements can include all of the elements or only some of the elements) in the extended electronic publication. Next, the embodiments can receive updates for a subset of elements in the extended electronic publication (e.g., an updated chapter, or an updated picture which may be referenced in multiple chapters, etc.). The embodiments can then create new versions of the subset of elements based on the updates (e.g., the new versions may be assigned a UUID that is distinct from the UUID for the older version). Next, the embodiments can perform a quality assurance process on the new versions of the subset of the elements (e.g., if the element is a questionnaire, then the quality assurance can check that the questions are unambiguous and do not contain any spelling or grammatical errors). Upon completion of the quality assurance process on at least a subset of the new versions, the embodiments can (1) upload the subset of the new versions to the publication server, (2) import the subset of the new versions into a staging area of the online course delivery platform, and (3) update the online course based on the imported subset of the new versions. Note that some of the new element versions may still be undergoing the quality assurance process, and those may not be uploaded or imported by the embodiment. In this manner, some embodiments described herein can maintain consistency between an electronic publication and a corresponding online course as they are incrementally updated.

Figure 4:
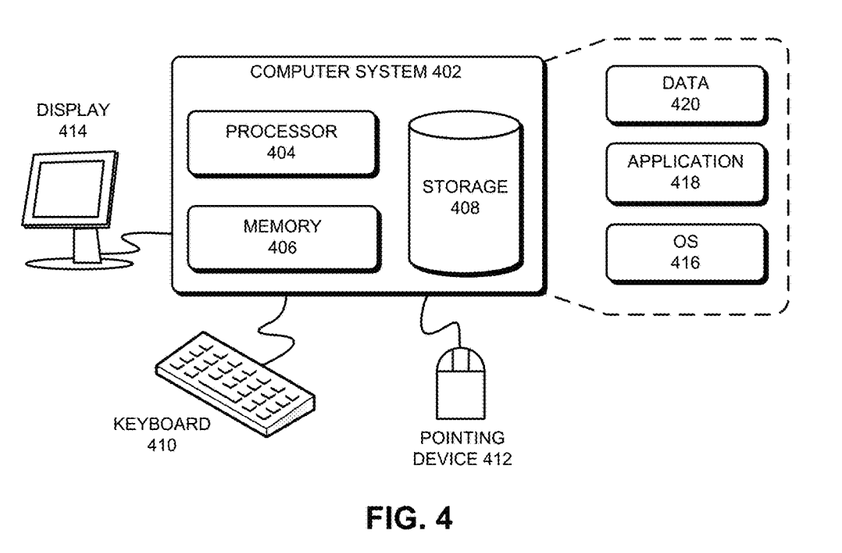
FIG. 4 illustrates a computer system in accordance with some embodiments described herein.

FIG. 4 illustrates a computer system in accordance with some embodiments described herein. Computer system 402 can include processor 404, memory 406, and storage device 408. Specifically, memory locations in memory 406 can be addressable by processor 404, thereby enabling processor 404 to access (e.g., via load/store instructions) and manipulate (e.g., via logical/floating point/arithmetic instructions) the data stored in memory 406. Computer system 402 can be coupled to display device 414, keyboard 410, and pointing device 412. Storage device 408 can store operating system 416, application 418, and data 420. Data 420 can include input required by application 418 and/or output generated by application 418.

Computer system 402 may automatically (or with user intervention) perform one or more operations that are implicitly or explicitly described in this disclosure. For example, computer system 402 can load application 418 into memory 406, and application 418 can then be used to create an extended electronic publication, publish the extended electronic publication, import the extended electronic publication into an online course delivery platform, and/or deliver an online course based on the imported extended electronic publication.

An Example Implementation

This section presents a specific implementation of a system for creating and delivering an online course based on an electronic publication. This implementation is being presented only for purposes of illustration and description. It is not intended to be exhaustive or to limit the present invention to the forms disclosed. Accordingly, many modifications and variations will be apparent to practitioners skilled in the art.

An embodiment described herein allows a publisher to use a single system to manage content that can be used to concurrently and consistently publish an e-book and deliver an online course An embodiment described herein extends the standard EPUB packaging structure for textbooks to support features for online course delivery. Some embodiments allow the content for the course to be packaged within a single EPUB document containing two distinct sections. The first section will include all content required by the standard EPUB-3 readers to render the textbook. The second section will contain additional digital assets and data relevant for online course delivery. The digital assets can be any supplementary learning resources, such as audio, video or other interactive assets, including HTML5 animations, HTML5 applications, assessments, discussion objects, etc. The present innovation can be used to specify the metadata for these digital assets that are packaged within the EPUB structure.

The metadata for the asset will be relevant for online course delivery and includes a universally unique identifier (UUID) for the assets, versioning of the asset, location and any other semantic tagging data associated with the asset. A standard EPUB reader will ignore the metadata. An embodiment of the present disclosure provides an EPUB extension spec that defines the metadata for any element in the EPUB document.

In this disclosure the term "EPUB" is sometime used to refer to the e-book standard, and is sometimes used to refer to an electronic publication that is in EPUB format. The meaning of the term "EPUB" will be clear based the context in which the term is used. The metadata can be stored in JSON format in the "data-ext" attribute of the EPUB element. An embodiment described herein allows a publisher to auto-import an EPUB document into an online course platform to allow the reuse of EPUB content and EPUB styling in the online course. It also ensures the accuracy of the location of the digital assets within the course hierarchy and the semantic data associated with them in the course database. Some embodiments also allow version control of the online course for subsequent revisions. During import, the UUID of each element in the EPUB is resolved with the UUID of the course elements. Once the UUID is resolved, the EPUB content and course content are compared using the versioning extension; if there is any update, the EPUB content is copied to the course content. Some embodiments allow the textbook publishers to use EPUB creation software like Adobe InDesign as their master content system for subsequent edits, thus ensuring that the online course, including the content and layout, is always in sync with the latest copy of the EPUB content.

Figure 5:
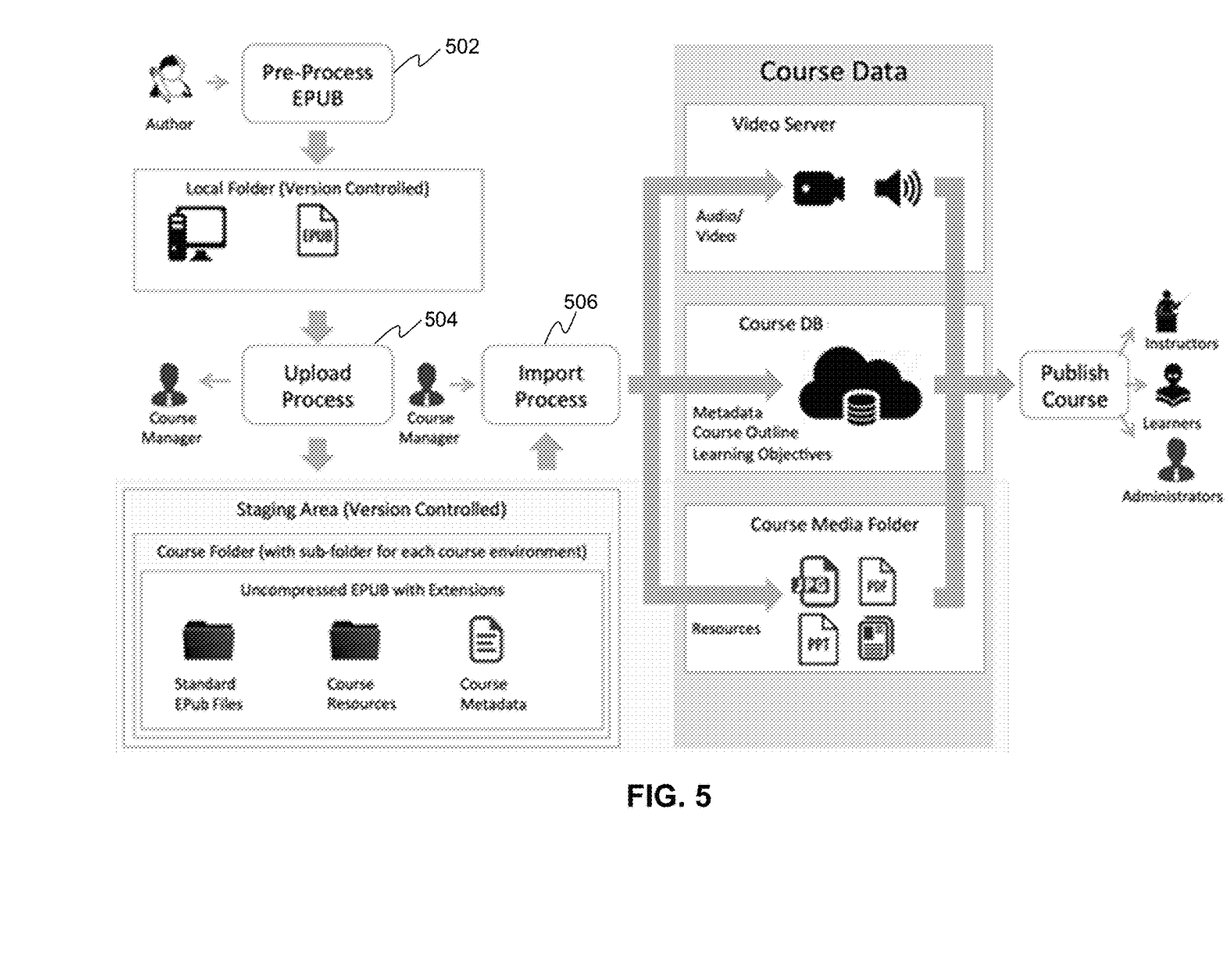
FIG. 5 illustrates an overall process for creating and importing an extended electronic publication in accordance with some embodiments described herein.

FIG. 5 illustrates an overall process for creating and importing an extended electronic publication in accordance with some embodiments described herein. The process can include the following steps: EPUB pre-processing 502, upload process 504, and import process 506. During EPUB pre-processing 502, the author of the textbook can prepare the EPUB document for import into an online course. During the upload process 504, the processed EPUB document can be uploaded to a staging area in the storage cloud. During the import process 506, the staged EPUB document can be parsed and the course can be compiled based on the components of the EPUB.

Figure 6:
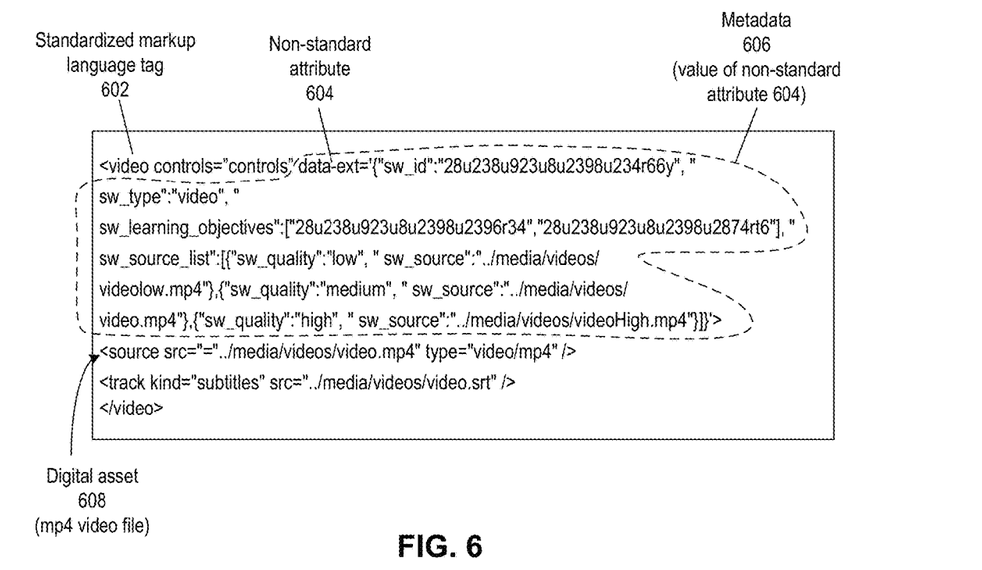
FIG. 6 illustrates an example of embedded metadata for a digital asset in an extended electronic publication in accordance with some embodiments described herein.

The first step is to prepare a standard EPUB document for an online course. This activity is performed in the local folder of a computer. The local folder for storing EPUB files can have an additional source control mechanism (e.g., subversion) in place for correct versioning of content. The standard EPUB is extended to add semantic information for individual elements of the EPUB document. Each relevant element is assigned a unique UUID identifier in the "data-ext" attribute defined for the element. In some embodiments, the UUID is an integral element of the course creation process to ensure correct revision control for the online course content. The "data-ext" attribute is used to store additional metadata for the EPUB element. For example, FIG. 6 illustrates an example of embedded metadata for a digital asset in an extended electronic publication in accordance with some embodiments described herein. As shown in FIG. 6, markup language tag 602 can be a standardized markup language tag (e.g., an EPUB markup language tag), metadata 606 can be formatted in JSON, and can be embedded in the electronic document as a value of non-standard attribute 604 (the name of the non-standard attribute in FIG. 6 is "data-ext" but any other non-standard attribute name would also work). The digital asset 608 example shown in FIG. 6 is that of an mp4 video file. However, metadata can be similarly embedded for any type of digital asset.

The following table provides additional examples of metadata that can be embedded in the electronic publication.

| No. | Name | Type | Description |
| --- | --- | --- | --- |
| 1 | sw_id | string | Unique ID like UUID |
| 2 | sw_ref_id | string | Reference to existing UUIDs of different elements. |
| 3 | sw_name | string | Name of the EPUB element |
| 4 | sw_description | string | Description of the EPUB element |
| 5 | sw_learning_objectives | array | List of learning objective IDs |
| 6 | sw_chapter_id | string | The UUID of the associated chapter |
| 7 | sw_topic_id | string | The UUID of the associated topic |
| 8 | sw_subtopic_id | string | The UUID of the associated subtopic |
| 9 | sw_bloom_code | string | Bloom Taxonomy code |
| 10 | sw_difficulty | string | Level of the content - indicates if the content is applicable for beginner, intermediate or advanced users |
| 11 | sw_instructor_only | string | If set to TRUE, the content can only be accessed by instructors. |
| 12 | sw_comments_for_instructor | array | List of strings with publisher comment for instructors |
| 13 | sw_recommended_assignment | string | If set to TRUE, the assessment will be added to the learning path of the student. |
| 14 | sw_semantic_tags | array | List of tags to provide semantic context |
| 15 | sw_version_id | string | Version ID of the content element |
| 16 | sw_attachments | array | List of assessments and resource objects. Normally used to link assessments and resources to a node in the table of contents (nay.xhtml) |
| 17 | sw_thumbnail_ref | string | UUID of course, chapter or asset thumbnail |
| 18 | sw_skill_identifier | string | ID for learning objective |
| 19 | sw_prerequisites | array | Array of learning objective UUIDs |
| 20 | sw_display_number | string | Chapter/Topic/Subtopic alphanumeric string for display numbering, e.g., "8A.1," "10.6," etc. |
| 21 | sw_data | string | List of discussion questions |

In this manner, the standard EPUB can be extended to add additional resources that are only relevant for online course delivery. Specifically, these resources can be packaged within the course_resources folder of the processed document. Examples of additional resources can include: (1) digital assets relevant for an online course, e.g., additional image, audio, video, or animations that are useful for online courses only, (2) cascading style sheets (CSSs) for course-specific styling can be included within the EPUB package, (3) supplementary documents formatted in PowerPoint, Portable Document Format, Microsoft Word, etc. can be included within the package (these resources are not relevant for the electronic publication but can be used by students or teachers for any pedagogical needs), and (4) assessment content including questions, solutions, and sequence can be packaged within the EPUB.

An additional course metadata file course_metadata.xml can be created. This file can contain semantic information about the course as well as any additional resources for the course. The following code example shows an instructor-only PDF document containing lecture notes:

```
<resource data
ext='{"sw_version_id":"9","sw_id":
"cafb1ab031a311e38cf6ce3f5 508acd9", "sw_name":
"Chapter 8 Lecture Notes", "sw_type":"pdf", "sw_sequence_number":"20", "sw_instructor_only":"true", "sw_data":
["course_resources/resources/Ch08a_r16e_lecture_notes.pdf"]}'>
</resource>
```

The course author can perform a sanity test for the processed EPUB. The processed EPUB with additional content and extensions should load on any standard EPUB readers on desktop or mobile devices. All standard EPUB functionality should continue to function on any software or device that is compliant with EPUB standards. Once the EPUB is ready for the upload process, the course author can check-in the EPUB document. The version control system (e.g., SVN) can automatically sync the EPUB document in the staging area. A new version number for the EPUB can be automatically generated by the version control system. The version control system can manage the syncing and merging of changes when multiple authors are concurrently editing the EPUB.

The upload process can be triggered when a new version of the EPUB file becomes available in the version control system. Specifically, for a given course, the upload process can check if an import for the same course is already in progress. If an import is in progress, the upload process can be terminated and the upload process can be reinitiated after completion of the import process. The upload process can first un-compress and expand the EPUB archive and prepare a course manifest (upload_manifest.xml) with the following attributes: (1) md5: md5 checksum of the EPUB-3s file, (2) path: pull path of the EPUB-3s file relative to the course folder name, (3) new: if a new file is created since last import, values can be 0/1/not specified, (4) updated: if a file has been updated since last import, values can be 0/1/not specified, and (5) deleted: if a file has been deleted since last import, values can be 0/1/not specified.

Next, the upload process can check if the course referenced in the EPUB already exists in the course management system. If the course does not exist, a brand new course can be automatically created in the course management system. If the course has been imported earlier, the upload process can compare the course files and their checksums with the last_imported_manifest.xml (the last imported manifest for the course) to create the upload_manifest.xml (the manifest for the current upload). The manifest attributes are updated to include new, updated and deleted status for each file in the course. This gives a precise list of files that need to be re-processed during the upload process. This also avoids unnecessary processing of files during import. The upload_manifest.xml is now uploaded to the course folder along with the rest of the course contents.

The upload process may have support for multiple course environments, e.g. development, test, production, etc. This allows the course to be uploaded and imported into a test environment for quality assurance before the final upload and import in a live environment with real users. The upload process can support individual buckets for each environment in the upload repository. The upload process can create a last_imported_manifest for each environment and prefix it with a UUID that is unique to that environment. The upload process can check for all available last_imported_manifest files (e.g., <UUID>_last_imported_manifest.xml) for a given course and generate corresponding versions of <UUID>_upload_manifest.xml so each environment has its version of what changed since the last import. These can be generated in addition to the upload_manifest.xml explained above which is used by an environment importing a course for the very first time.

The upload process can create an expanded version of the EPUB document in the course folder. The course folder can reside in the staging area of the storage cloud. This allows the import process to selectively process individual files from the expanded EPUB archive.

The upload process can optionally initiate a parallel upload when the EPUB staging area is hosted on a scalable storage service or a cloud storage service for efficient handling of the upload process. The upload process can send an email notification to the course manager once the upload process is complete.

Once an EPUB file is uploaded to the staging area for a specific import environment (e.g., quality assurance, production, etc.), it becomes available in the environment's course management system for import. The course manager can then initiate the import process from the course management system using the import tool. Specifically, the course manager can select one of the courses for which the EPUB file has been uploaded to the staging area and initiate the course import process. The import tool can display the version number of the course prior to import. The import process can check if any EPUB upload process for the same course is in progress. If a course upload is in progress, the import process can be terminated, and the user can be notified and asked to retry the import later.

The course manager can also choose to re-import the complete course. If this option is selected, the import process will treat the EPUB import like a new course import and all existing course content and data will be erased and overwritten with the new data. The import process can use the course manifest to create a change list from the last import for the course. This change list can be presented to the course administrator. The course administrator can choose to abort the import process after reviewing the changes.

If the import process is allowed to continue, the import process can copy the standard EPUB media files from the staging folder to the appropriate course folder in the storage cloud. The staging folder and the course media folder are designed to co-exist on the same storage infrastructure in the storage cloud for optimal transfer of large media files. When using a scalable storage cloud, the import process can initiate parallel transfers of files to reduce import duration.

The video assets, if any, can be transferred to the video server course folder. The Metadata/Reference for these assets from the "data-ext" attribute of the elements can be processed and stored in the course database for the corresponding UUID and the version. Additional contextual attributes for elements can also be imported.

The EPUB navigation elements can be processed for import. Specifically, the element type <nav EPUB: type="toc"> of EPUB/nav.xhtml can be parsed and the chapters, topics, subtopics, and parts in the XHTML can be imported. The sequence and the index of the imported chapters, topics, subtopics, and parts can be used to automatically create the outline for the online course. Note that the "data-ext" attribute for table of contents elements can be optionally used to associate a thumbnail image with each chapter, topic, or subtopic. During the import process, the thumbnail can be copied from the staging location and saved in the course destination location. The course itself can be associated with a thumbnail. The course thumbnail details can be obtained by parsing the course_metadata.xml file in the EPUB structure. The thumbnail references for the course and the nav elements can be reconciled with the actual thumbnail UUIDs available in the course_metadata.xml.

The next step can involve processing of resources such as presentations, documents, source code, assessments, animations, video, audio, etc. in the EPUB structure. The metadata for the course resources are specified in the course_metadata.xml. During the import process, the resources' UUIDs and versions can be imported into the course database. If the resources are audio or video, they can be transferred to the course folder in the video server. All other resources will be transferred to the media folder of the course in the storage server.

Next, the resources can be linked to the course outline by using the sw_attachments attribute. The sw_attachments attribute contains a JSON array with references to the UUID of the resources and learning objectives. The sw_attachments attribute ensures that the resources are attached to the correct lesson. The students and teacher can use these resources for any pedagogical needs.

Course level metadata inside <metadata></metadata> tags can then be imported and saved in the database. The course level metadata includes: (1) course UUID, (2) course Version, and (3) course Namespace. An example of course level metadata is shown below:

<metadata>
<meta property="sw_id">123314543dsjfgfkdg432545543</meta>
<meta property="sw_version">123314543dsjfgfkdg432545543</meta>
<meta property="course_namespace">ebook</meta>
</metadata>

Learning objectives can be provided in the course_resources folder as an xhtml file. The sw_id field in data-ext of each learning objective can be resolved and used as the UUID for the learning objectives. The course assessments can be imported from the course_resources folder. The assessments can be packaged as individual zip files in the resources folder, e.g., chapter1_practice.zip. During import, the zip files can be uncompressed and questions can be individually imported into the course question bank. The metadata associated with each question, e.g., the learning objectives, difficulty, etc., can be parsed and inserted into the course database. Next, the individual questions that are imported can be grouped as assessments in the course database. In some embodiments, the assessment zip files/archive files can be erased after importing the questions.

The nav.xhtml attachments can be processed for learning objectives and linked to the chapter/topic/subtopic. Specifically, the learning objective prerequisites can be added for each learning objective using the sw_prerequisite field in data. The prerequisites can be listed as an array of learning objective UUIDs that must precede the current learning objective in the learning path. The lesson content can then be imported using the standard EPUB structure and mapped to relevant areas of the course.

When a course import is completed successfully, the current course manifest can be copied to a last_imported_manifest.xml. On completion, the import process shows a report with all newly imported/updated lesson and assessment content. Text lessons, resources, and learning objectives that are imported successfully are highlighted in the "Success" section of the report. Any errors or warnings are highlighted separately.

Multiple environments can be importing from the same repository. Specifically, each environment can have a UUID for a given course that it generates when importing a course. The last_imported_manifest created (as explained above) can be prefixed with this UUID (<hash>_last_imported_manifest) to uniquely identify what content has been imported by an environment.

All newly imported lessons, questions, and assessments by default are set to "QA" status (i.e., these objects need to go through a quality assurance process before they can be delivered in the online course). The course manager can choose to search and preview content in "QA" status within the course. Specifically, the course manager can either publish all newly imported content or selectively choose the content to publish.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that, when executed by a computer, cause the computer to perform a method for creating an extended electronic publication based on an electronic publication, wherein the extended electronic publication enables delivery of an online course corresponding to the electronic publication, the method comprising:
   receiving the electronic publication comprising informational content, standardized markup language tags, and standardized markup language attributes, wherein the standardized markup language tags and standardized markup language attributes specify styling and layout of the informational content for presentation on a standard electronic reader, wherein the electronic publication is in EPUB format;
   adding metadata for digital assets to the electronic publication, wherein the metadata for the digital assets is embedded in the electronic publication in a manner that causes the standard electronic reader to ignore the metadata while presenting the electronic publication, and wherein the digital assets along with the metadata for the digital assets enable delivery of the online course corresponding to the electronic publication, wherein the metadata is specified as a value of a non-standard attribute, wherein the non-standard attribute is ignored by the standard electronic reader, wherein the metadata is encoded in JavaScript Object Notation (JSON) format, and wherein the metadata for each digital asset includes a universally unique identifier (UUID) that is unique across the extended electronic publication; and creating the extended electronic publication by packaging the digital assets with the electronic publication containing the added metadata for the digital assets, wherein the extended electronic publication includes multiple references to a first digital asset, wherein the metadata for each reference to the first digital asset includes a distinct UUID, wherein the metadata for each reference to the first digital asset includes a user interaction feature, and wherein a state of the user interaction feature for each reference to the first digital asset is maintained independently of states of user interaction features for other references to the first digital asset.

2. The non-transitory computer-readable storage medium of claim 1, wherein the user interaction feature enables a user to post a comment for the digital asset, and to read comments for the digital asset that were posted by other users.

3. The non-transitory computer-readable storage medium of claim 1, wherein the user interaction feature enables a user to communicate with an instructor.

4. The non-transitory computer-readable storage medium of claim 1, wherein the user interaction feature enables a user to demonstrate proficiency by answering a series of questions related to the digital asset.

5. The non-transitory computer-readable storage medium of claim 1, wherein the user interaction feature enables a user to manipulate the digital asset.

6. The non-transitory computer-readable storage medium of claim 1, wherein the method further comprises:
uploading the extended electronic publication to a publication server, thereby enabling users to download and read the extended electronic publication on standard electronic readers; and
importing the extended electronic publication into an online course delivery platform, thereby enabling users to take the online course corresponding to the electronic publication.

7. The non-transitory computer-readable storage medium of claim 6, wherein said importing the extended electronic publication into the online course delivery platform comprises:
deriving a course hierarchy from a table of contents section of the extended electronic publication;
extracting course contents from the extended electronic publication based on the course hierarchy;
determining styling and layout of the extracted course contents based on the standardized markup language tags and standardized markup language attributes in the extended electronic publication;
extracting metadata from the extended electronic publication; and
associating digital assets with the extracted course contents based on the extracted metadata.

8. The non-transitory computer-readable storage medium of claim 6, wherein the method further comprises:
maintaining version information for a set of elements in the extended electronic publication;
receiving updates for a subset of elements in the extended electronic publication;
creating new versions of the subset of elements based on the updates;
performing a quality assurance process on the new versions of the subset of the elements; and
upon completion of the quality assurance process on at least a subset of the new versions,
uploading the subset of the new versions to the publication server,
importing the subset of the new versions into a staging area of the online course delivery platform, and
updating the online course based on the imported subset of the new versions.

9. The non-transitory computer-readable storage medium of claim 1, wherein files for the electronic publication are stored in a directory, and wherein the method further comprises:
creating a separate directory to store files for digital assets that are only used in the online course; and
storing digital assets that are only used in the online course in the separate directory.

10. An apparatus, comprising:
a processor; and
a non-transitory computer-readable storage medium storing instructions that, when executed by the processor, cause the apparatus to perform a method for creating an extended electronic publication based on an electronic publication, wherein the extended electronic publication enables delivery of an online course corresponding to the electronic publication, the method comprising:
receiving the electronic publication comprising informational content, standardized markup language tags, and standardized markup language attributes, wherein the standardized markup language tags and standardized markup language attributes specify styling and layout of the informational content for presentation on a standard electronic reader wherein the electronic publication is in EPUB format;
adding metadata for digital assets to the electronic publication, wherein the metadata for the digital assets is embedded in the electronic publication in a manner that causes the standard electronic reader to ignore the metadata while presenting the electronic publication, and wherein the digital assets along with the metadata for the digital assets enable delivery of the online course corresponding to the electronic publication, wherein the metadata is specified as a value of a non-standard attribute, wherein the non-standard attribute is ignored by the standard electronic reader, wherein the metadata is encoded in JavaScript Object Notation (JSON) format, and wherein the metadata for each digital asset includes a universally unique identifier (UUID) that is unique across the extended electronic publication; and
creating the extended electronic publication by packaging the digital assets with the electronic publication containing the added metadata for the digital assets, wherein the extended electronic publication includes multiple references to a first digital asset, wherein the metadata for each reference to the first digital asset includes a distinct UUID, wherein the metadata for each reference to the first digital asset includes a user interaction feature, and wherein a state of the user interaction feature for each reference to the first digital asset is maintained independently of states of user interaction features for other references to the first digital asset.

11. A method for creating an extended electronic publication based on an electronic publication, wherein the extended electronic publication enables delivery of an online course corresponding to the electronic publication, the method comprising:

receiving the electronic publication comprising informational content, standardized markup language tags, and standardized markup language attributes, wherein the standardized markup language tags and standardized markup language attributes specify styling and layout of the informational content for presentation on a standard electronic reader, wherein the electronic publication is in EPUB format;

adding, by computer, metadata for digital assets to the electronic publication, wherein the metadata for the digital assets is embedded in the electronic publication in a manner that causes the standard electronic reader to ignore the metadata while presenting the electronic publication, and wherein the digital assets along with the metadata for the digital assets enable delivery of the online course corresponding to the electronic publication, wherein the metadata is specified as a value of a non-standard attribute, wherein the non-standard attribute is ignored by the standard electronic reader, wherein the metadata is encoded in JavaScript Object Notation (JSON) format, and wherein the metadata for each digital asset includes a universally unique identifier (UUID) that is unique across the extended electronic publication; and creating the extended electronic publication by packaging the digital assets with the electronic publication containing the added metadata for the digital assets, wherein the extended electronic publication includes multiple references to a first digital asset, wherein the metadata for each reference to the first digital asset includes a distinct UUID, wherein the metadata for each reference to the first digital asset includes a user interaction feature, and wherein a state of the user interaction feature for each reference to the first digital asset is maintained independently of states of user interaction features for other references to the first digital asset.

* * * * *